(12) United States Patent
Nies

(10) Patent No.: US 8,240,955 B2
(45) Date of Patent: Aug. 14, 2012

(54) TOWER SEGMENTS AND METHOD FOR OFF-SHORE WIND TURBINES

(75) Inventor: Jacob Johannes Nies, HA Zwolle (NL)

(73) Assignee: General Electric Company, Schenectady, NY (US)

( * ) Notice: Subject to any disclaimer, the term of this patent is extended or adjusted under 35 U.S.C. 154(b) by 66 days.

(21) Appl. No.: 12/826,044

(22) Filed: Jun. 29, 2010

(65) Prior Publication Data

US 2011/0314750 A1 Dec. 29, 2011

(51) Int. Cl.
*E02D 25/00* (2006.01)

(52) U.S. Cl. ...................... 405/204; 405/203

(58) Field of Classification Search ............ 405/195.1, 405/203, 204, 205, 206, 207, 208, 209
See application file for complete search history.

(56) References Cited

U.S. PATENT DOCUMENTS

| | | | |
|---|---|---|---|
| 4,222,683 A * | 9/1980 | Schaloske et al. | 405/204 |
| 7,293,960 B2 * | 11/2007 | Yamamoto et al. | 416/85 |
| 2005/0286979 A1 * | 12/2005 | Watchorn | 405/203 |
| 2007/0075547 A1 * | 4/2007 | Kothnur et al. | 405/231 |
| 2007/0269272 A1 * | 11/2007 | Kothnur et al. | 405/195.1 |
| 2008/0292408 A1 * | 11/2008 | Kothnur et al. | 405/228 |
| 2010/0150665 A1 * | 6/2010 | Karal | 405/232 |
| 2010/0316450 A1 * | 12/2010 | Botwright | 405/206 |
| 2011/0037264 A1 * | 2/2011 | Roddier et al. | 290/44 |
| 2011/0061332 A1 * | 3/2011 | Hettick | 405/224 |
| 2011/0123274 A1 * | 5/2011 | Soe-Jensen | 405/195.1 |
| 2011/0135400 A1 * | 6/2011 | Hall | 405/195.1 |

* cited by examiner

*Primary Examiner* — Frederick L Lagman
(74) *Attorney, Agent, or Firm* — Global Patent Operation; Douglas D. Zhang

(57) ABSTRACT

A method for erecting an off-shore wind turbine includes providing a wind turbine tower socket segment that includes a basin positioned at one end of the wind turbine tower socket segment. The basin is filled with water. A wind turbine tower plug segment, which has a closed surface at one end of the wind turbine tower plug segment, is brought in connection with the wind turbine tower socket segment. Further, a wind turbine tower socket segment for off-shore wind turbines is provided that includes a basin adapted for receiving water on one side of the segment. The socket segment is adapted for receiving a wind turbine tower plug segment. Further, a wind turbine tower plug segment adapted for being plugged into a wind turbine tower socket segment is provided. The wind turbine tower plug segment includes a closed surface at one end of the segment. Further, a wind turbine is provided.

18 Claims, 9 Drawing Sheets

TOWER SEGMENTS AND METHOD FOR OFF-SHORE WIND TURBINES

BACKGROUND

The present disclosure relates to wind turbines. More particularly, it relates to off-shore wind turbines and methods for installing off-shore wind turbines.

Due to limited availability of suitable areas for wind turbines on land, the concept of off-shore wind energy production has gained importance in recent years. In shallow coastal waters, wind turbines are usually mounted on concrete foundations on the sea bed, whereas in deeper waters, the turbines may be fixed via chains, cables, lines or moorings to the sea bed.

Off-shore towers and foundations are available in many sorts. For water depths over 30 meters, a jacket type is chosen in many cases. In many cases, a jacket includes multiple legs joining around or above the waterline, often interconnected via cross members. The transition from the jacket to the main tower is often made just above the highest wave height, well below the height of the blade-tip in its lowest position.

The installation of off-shore wind turbines is critical. Off-shore wind turbines require weather windows in which the weather conditions allow construction of the wind turbines at sea. In particular, the wave height and the resulting motion of the boats and ships present is an important factor for the set up and erection of off-shore wind turbines. For instance, some off-shore turbine installation techniques require the wave height to be below 1 m or maximally 2 m. Further, when installing large turbines, prior art techniques require the provision of hydraulic buffers and/or heavy transition segments with damping cylinders attached. This is voluminous, inefficient, and expensive.

The lower the weather condition requirements, the larger the weather windows that allow the set up. Further, the less amount of work that has to be done at sea, the more work can be done in those periods and the faster the wind turbine can be put into operation.

In summation, in order to erect an off-shore wind turbine one has to bring together large components in a hostile environment. In light of the above, it is desirable to have a wind turbine erection method for off-shore use that allows an easier set up under non-perfect weather conditions.

BRIEF DESCRIPTION

In view of the above, a method for erecting an off-shore wind turbine is provided. The method includes providing a wind turbine tower socket segment that includes a basin positioned at one end of the wind turbine tower socket segment. The method further includes filling the basin with water and bringing a wind turbine tower plug segment in connection with the wind turbine tower socket segment, with the wind turbine tower plug segment having a closed surface at one end of the wind turbine tower plug segment.

According to a further embodiment, a wind turbine tower socket segment for off-shore wind turbines is provided. The wind turbine tower socket segment includes a basin on one side of the segment. The basin is adapted for receiving water. The wind turbine tower socket segment is adapted for receiving a wind turbine tower plug segment.

According to a further embodiment, a wind turbine tower plug segment is provided. The wind turbine tower plug segment is adapted for being plugged into a wind turbine tower socket segment. The wind turbine tower plug segment includes a closed surface at one end of the segment.

According to a further embodiment, a wind turbine is provided. The wind turbine includes a wind turbine tower socket segment as described herein and a wind turbine tower plug segment as described herein. The wind turbine tower plug segment is fixed in the wind turbine tower socket segment.

Embodiments are also directed at apparatuses for carrying out the disclosed methods and including apparatus parts for performing each described method step. These method steps may be performed by way of hardware components, a computer programmed by appropriate software, by any combination of the two or in any other manner. Furthermore, embodiments are also directed at methods by which the described apparatus operates. It includes method steps for carrying out every function of the apparatus Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein:

FIG. 1 is a schematic perspective view of an exemplary wind turbine.

FIG. 2 is a schematic perspective view of an exemplary off-shore wind turbine according to embodiments described herein.

FIG. 3 is a schematic perspective view of an exemplary off-shore wind turbine according to embodiments described herein.

FIG. 4 is a schematic perspective view of an exemplary off-shore wind turbine according to embodiments described herein.

FIGS. 5 to 7 exemplarily illustrate the method of erecting off-shore wind turbines according to embodiments described herein.

FIG. 5 is a schematic view of a wind turbine tower socket segment and a wind turbine tower plug segment according to embodiments described herein.

FIG. 6 is a schematic view of a wind turbine tower socket segment and a wind turbine tower plug segment according to embodiments described herein.

FIG. 7 shows exemplarily a view of a wind turbine tower socket segment and a wind turbine tower plug segment in direct contact with each other according to embodiments described herein.

FIG. 8 shows exemplarily a view of a wind turbine tower socket segment and a wind turbine tower plug segment according to embodiments described herein.

FIG. 9 shows a cross-sectional view of the wind turbine tower according to embodiments described herein.

FIG. 10 shows a portion of a wind turbine according to embodiments described herein.

DETAILED DESCRIPTION OF THE INVENTION

Figure 1:
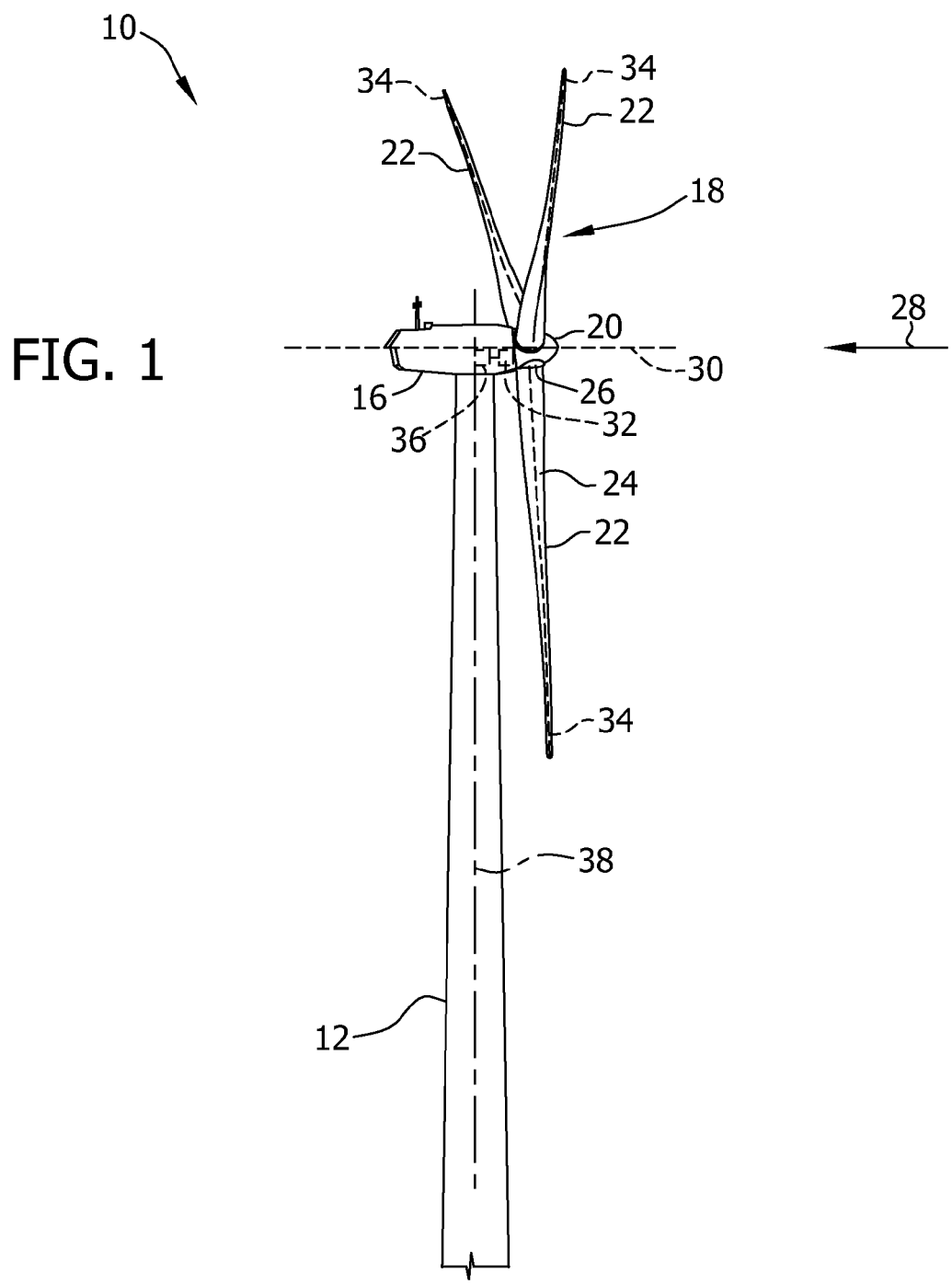
FIGS. 1 to 10 show exemplary embodiments of the systems and methods described herein.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

The "closed surface" as used herein is generally any surface provided at one end of the wind turbine tower plug segment that acts as a closure of the segment. For instance, if the wind turbine tower plug segment has the shape of a tube, the term "closed surface" at one end of the tube intends to be representative for a closure of the tube at this end. The average orientation of the closed surface is typically perpendicular to the axial direction of the wind turbine tower plug segment.

The embodiments described herein include an off-shore wind turbine system and the method for installation thereof. Accordingly, when erecting the wind turbine the basin is filled with water first. Typically, water volumes of at least 10 $m^3$, more typically of at least 25 $m^3$ are pumped into the water basin. Afterwards, the wind turbine tower plug segment is brought into contact with the water in the basin such as by lowering the segment into the basin. According to embodiments, the closed surface of the wind turbine plug is thereby immerged into the filled basin of the wind turbine tower socket segment. Thereby, the water acts as a buffering system. As used herein, the terms "to immerge" and "to plug" are used synonymously.

The damping force exerted by the fluid pressure on the segments particularly depends on the gap size between the tower segments on the gap size between the wind turbine tower plug segment and the wind turbine tower socket segment. Typically, when lowering the upper tower segment to the lower tower segment, a part of the weight or even the complete weight is carried by the water present in the basin. At the same time, the water is pressed out from the basin so that the amount of water is reduced and the two segments come closer. For instance, in case of a wind turbine having altogether about 710 tons, the wind turbine tower plug and socket segment approach each other at about 0.2 m/s when all weight is carried by the water buffer.

Typically, the inner walls of the basin of the wind turbine tower socket segment may have a particular shape. The shape may be non-flat. "Non-flat" in this context is to be understood in that the cross-section of the basin has a wall that is non-circularly surrounding the centre of the basin. The "inner wall" is the wall of the basin that is oriented towards the center of the basin. In other embodiments, the basin may be of cylindrical shape with a circular cross-section.

In addition, or alternatively, the wind turbine tower plug segments may be provided with an outer wall that is specifically shaped. In particular, the shape may be non-flat. "Non-flat" in this context is to be understood that the outer wall's cross-section comprises deviations from the circular shape.

Typically, the shape of the inner wall of the basin corresponds to the shape of the outer wall of the wind turbine tower plug segment. Normally, the corresponding shapes are designed in such a way that a stream of water can flow out of the basin when the wind turbine tower plug segment is emerged into the filled basin.

The method according to an embodiment described herein further comprises providing a first shape at the inner walls of the basin and a second shape of the closed surface of the wind turbine tower plug segment such that a stream of water flows out of the basin when the wind turbine tower plug segment is immerged into the filled basin.

According to embodiments, when erecting the wind turbine, the flow of water out of the basin is between 1 $m^3$/sec and 10 $m^3$/sec, typically between 2 $m^3$/sec and 7 $m^3$/sec.

Typically, the shapes of the basin and, if present, the guiders at the tower may be chosen so that air can escape from the space between the plug and socket segment first when the wind turbine tower plug segment is lowered. Thereby, it is avoided that the damping is made smaller in orders of magnitude when air is compressed in the cavity. In other words, it is typically desired that the space between wind turbine tower plug segment and wind turbine tower socket segment is filled only with water during the lowering so that there is constant compressibility of the fluid present in the basin. This can be facilitated by providing a basin shaped in such a way that the formation of trapped pockets of air is avoided for those times when the wind turbine tower plug segment is lowered into the basin. Pockets of air would soften or weaken the cushion effect because the air tends to escape easier than the damping fluid water.

Typically, filling of the basin is undertaken by pumping water into the basin. The water is typically seawater. It may also be fresh water. In other embodiments, filling of the basin is undertaken by immerging the wind turbine tower socket segment into the water, typically at least partly below sea level.

The wind turbine tower socket segment is typically provided with a flange positioned at one end of the segment. The flange is normally adapted to be connected to the wind turbine tower plug segment.

As described, the wind turbine tower socket segment has a basin. "A basin," as used herein, is to be understood as a watertight structure capable of receiving and keeping water.

According to embodiments, the wind turbine tower socket segment is provided with a pipe system. The pipe system may be provided for filling the basin with water. In some embodiments, the pipe system connects the basin with the outside of the wind turbine tower. Thereby, it is possible that the pipe system is in direct contact with the seawater.

According to embodiments, a plurality of guiders are provided. The guiders are typically positioned on the circumferential surface of the wind turbine plug segment. Alternatively or additionally, the guiders can be positioned on the circumferential surface at the inner wall of the wind turbine socket segment. The overall number of guiders is typically at least four. According to other embodiments, at least six or at least eight guiders are provided. Typically, the guiders are positioned equidistantly along the circumferential surface.

The guiders allow for positioning of the wind turbine tower plug segment centrically within the wind turbine tower socket segment when the wind turbine tower plug segment is lowered. Typically, there is a recess provided between neighboring guiders. The recess allows the water to flow out from the basin when the wind turbine tower plug segment is immerged into the basin of the wind turbine tower socket segment.

Typically, the flow of water out of the basin at realistic lowering speeds can be regulated by the corresponding shape of the wind turbine tower plug segment and socket segment. For instance, if the outer radius of the wind turbine tower plug segment is 3.0 m, and the inner radius of the wind turbine tower socket segment (which is typically the basin's inner radius) is 3.01 m, the remaining area through which the water can flow is about 0.2 m². In the event of additionally provided guiders, this flow area is further reduced, for instance, by 20%.

According to embodiments, the wind turbine tower plug segment is provided with a flange typically positioned at one end of the wind turbine tower plug segment. Typically, it is positioned at the end which is supposed to be the lower end of the segment when the wind turbine is erected. The flange is adapted to be connected to the wind turbine tower socket segment.

Typically, the wind turbine tower socket segment may be provided with a flange at one end which is typically the end which is supposed to be the upper end of the socket segment when the wind turbine is erected. Typically, the flange provided at the wind turbine tower socket segment is adapted to be connected to the wind turbine tower plug segment.

Typically, the flanges provided according to the description herein can extend outwardly. Thereby, they extend from the tower segments in the positive radial direction. Hence, the access to the flanges during installation or maintenance is simplified. A typical flange as described herein encircles the respective segment completely, i.e. at 360°.

The flanges of the segment described herein may also extend inwardly, that is, in the negative radial direction as seen from the tower segments' walls. Whereas the access to them may be more complicated than to the outwardly extending flanges, for instance, during the erection of the wind turbine, they are better protected from weather conditions because they do not have direct contact with the outer environment.

Typically, the flanges may also be shaped to support and control the water flow during erection of the wind turbine. For instance, they may be provided with grooves allowing water to pass through them during immersion of the wind turbine tower plug segment into the basin of the wind turbine tower socket segment. Typically, the shaping is chosen such that the stability of the flanges is not affected. The flanges of the wind turbine tower plug segment and the socket segment are fixed to each other after the plug socket is lowered to its final position, which is in direct contact with the wind turbine tower socket segment.

According to embodiments, the wind turbine tower plug segment is provided with a closed surface at its outer end. That is, the plug segment is typically a hollow tube that is closed at one end. This end is typically the lower end when the wind turbine tower plug segment is erected. The closed surface is immerged into the water of the basin when the wind turbine is erected. The resulting resistance of the water presses against the closed surface of the wind turbine tower plug segment so that the water serves as a hydraulic buffer during erection.

The closed surface may be provided with a closable opening. The opening can be a door, a window, a hatchway, a porthole, or the like. This opening is typically closed during erection of the wind turbine and adapted for withstanding the resulting pressure of the water.

However, after the erection, this opening may be opened and allow a person, such as a technician, to pass through. For instance, the wind turbine tower plug segment may be provided with a door to the outer side where a technician can enter the inside of the wind turbine tower. In order to get to the basin, or to the flanges at the wind turbine tower plug segment in the case of inwardly extending flanges, the technician may use the closable opening to get there. Hence, the closable opening is typically adapted for allowing a person to pass through. In embodiments, the opening covers an area of at least 0.2 m². For instance, it may be of circular shape with a diameter of at least 60 cm.

The system of a wind turbine tower plug segment and a wind turbine tower socket segment as described herein may be used as essential parts of a wind turbine tower. It may be used as parts of the main tower of the wind turbine.

In other embodiments, typically three wind turbine tower plug segments and three wind turbine tower socket segments are provided and used as transition segments between foundation and the main tower. The term "main tower" is to be understood as that part of the tower that is a single-pole. The term "transition segment" is used as that part of the tower that comprises more poles, typically three poles. The term is used synonymously to the term "jacket". According to typical embodiments, the main tower extends at least from a height corresponding to the lowest position of the blades up to the nacelle.

According to embodiments, a pumping system may be provided for pumping water into the basin of the wind turbine tower socket segment. The pumping system typically comprises at least one pump that may be electrically driven. According to embodiments, the pumping system is provided within the wind turbine tower socket segment. In other embodiments, the pump is detachable and reusable with further turbines. Typically, the pipe system of the wind turbine tower socket segment is adapted to be connected to the pump. In embodiments, parts or every component of the pipe system may be adapted to be used for cabling after the erection of the wind turbine tower. Typically, elements of the wind turbine tower plug segment and/or the wind turbine tower socket segment such as the opening can be used for cabling as well.

Typically, overpressure relieve valves may be provided in order prevent collapse of the structure due to high pressure. They may also be used to prevent overheating of the water in the pump at zero flow. A valve system may also be provided to cut off the water supply. This way pressure below atmospheric pressure will occur when the wind turbine tower plug segment is moving upwards during erection. This may happen due to the motion of the sea. Hence, the method described herein may benefit from the under pressure between the plug and socket segment. This under pressure avoids uncontrolled movement of the wind turbine tower plug segment out of the wind turbine tower socket segment's basin again.

Further, non-return valves may be provided in order to avoid water escaping too easily when pressure is applied, i.e. when the wind turbine tower plug segment is immerged into the basin.

Typically, the pumping system and/or the valve system may be controlled by a controller. The controller may be positioned within the wind turbine tower socket segment. It may also be positioned on the detachable water pump. It may receive input signals from detectors or other information sources such as one or more of the following information: the pressure in the basin, the movement of the barge lifting the wind turbine tower plug segment, relative movement of the wind turbine tower socket segment and the wind turbine tower plug segment etc.

According to embodiments, the wind turbine is designed such that, when in operation, the connection of the wind turbine tower plug segment and the wind turbine tower socket segment is of a height which corresponds to the height of the blade tip in its lowest position. Such a height can be, for instance, between 10 and 30 m over sea level. Thus, the foundation and the wind turbine tower socket segment can be preinstalled and the remaining wind turbine can be erected by bringing the wind turbine tower plug segment in connection with the wind turbine tower plug segment. Thus, the installation of the tower can thus be cheaper since the weather windows for the installation method according to the present disclosure are larger, and expensive buffering systems necessary on the mounting flange can be avoided or reduced.

According to some embodiments, after providing the foundation and the lower tower segment, the complete remaining wind turbine (including nacelle and blades) is installed in one step at sea. The upper tower segment of the wind turbine tower plug segment may extend up to the nacelle or may be already fixedly connected to a further tower segment. This work can be done on-shore. Further, the installation of the nacelle and the blades can also be done beforehand on-shore, for instance on the floating docks. Hence, the complete installed wind turbine can be lifted by a crane and so that the upper tower segment and the lower tower segment are brought into contact. Typically, the upper tower segment includes a wind turbine tower plug segment and/or the lower tower segment includes a wind turbine tower socket segment. The water in the basin serves as a damping fluid.

According to embodiments, three transition segments are used. The wind turbine tower socket segments of the transition segments are typically fixedly connected to the sea bed. The remaining wind turbine including three wind turbine tower plug segments can be pre-installed on-shore. During erection of the wind turbine, the three wind turbine tower plug segments are lowered into the three fixedly provided wind turbine tower socket segments. This allows more of the support structure to be prepared in a harbor, and less work to be done at sea. Further, the size of the transition segments are smaller in comparison to a one pole tower set-up which makes them more economical.

According to embodiments, the wind turbine tower plug segment and/or the wind turbine tower socket segment can be provided with a door or the like for allowing a person to enter the inside of the segments. Typically, and not limited to this embodiment, the segments are tubes typically made of steel.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18. In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

Figure 2:
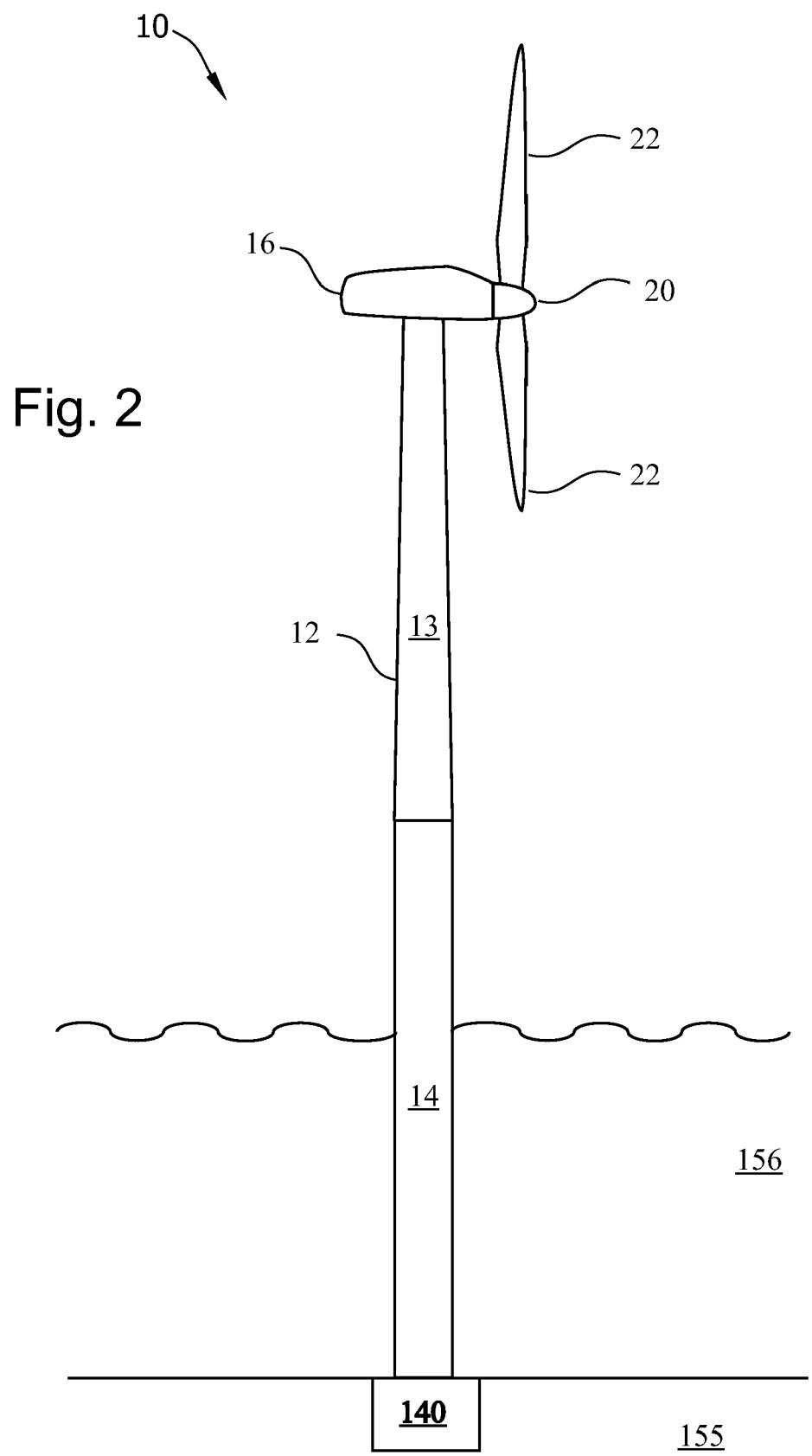

FIG. 2 shows a schematic side view of an embodiment of the off-shore wind turbine 10. In an embodiment, the wind turbine is connected to the sea bed via foundation 140. Alternatively or additionally, it is possible to provide at least one cable or chain, typically by a plurality of chains, cables or lines, the latter also called moorings in the nautical context.

Instead of a foundation 140, it is possible that the wind turbine tower comprises typically circular sections that are rammed into the sea bed. Typically, they are rammed into the sea bed at least 20 m, more typically at least 25 m so they support the wind turbine weight and withstand bending moments.

The tower may include one or more tower segments. For example, in FIG. 2 a lower tower segment 14 and an upper tower segment 13 is illustrated. The lower tower segment 14 is typically preinstalled. For instance, the lower tower segment 14 may be the wind turbine tower socket segment as described herein. The upper tower segment 13 is mounted to the lower tower segment by the method as described herein. The upper tower segment 13 may be the wind turbine tower plug segment as described herein.

Figure 3:
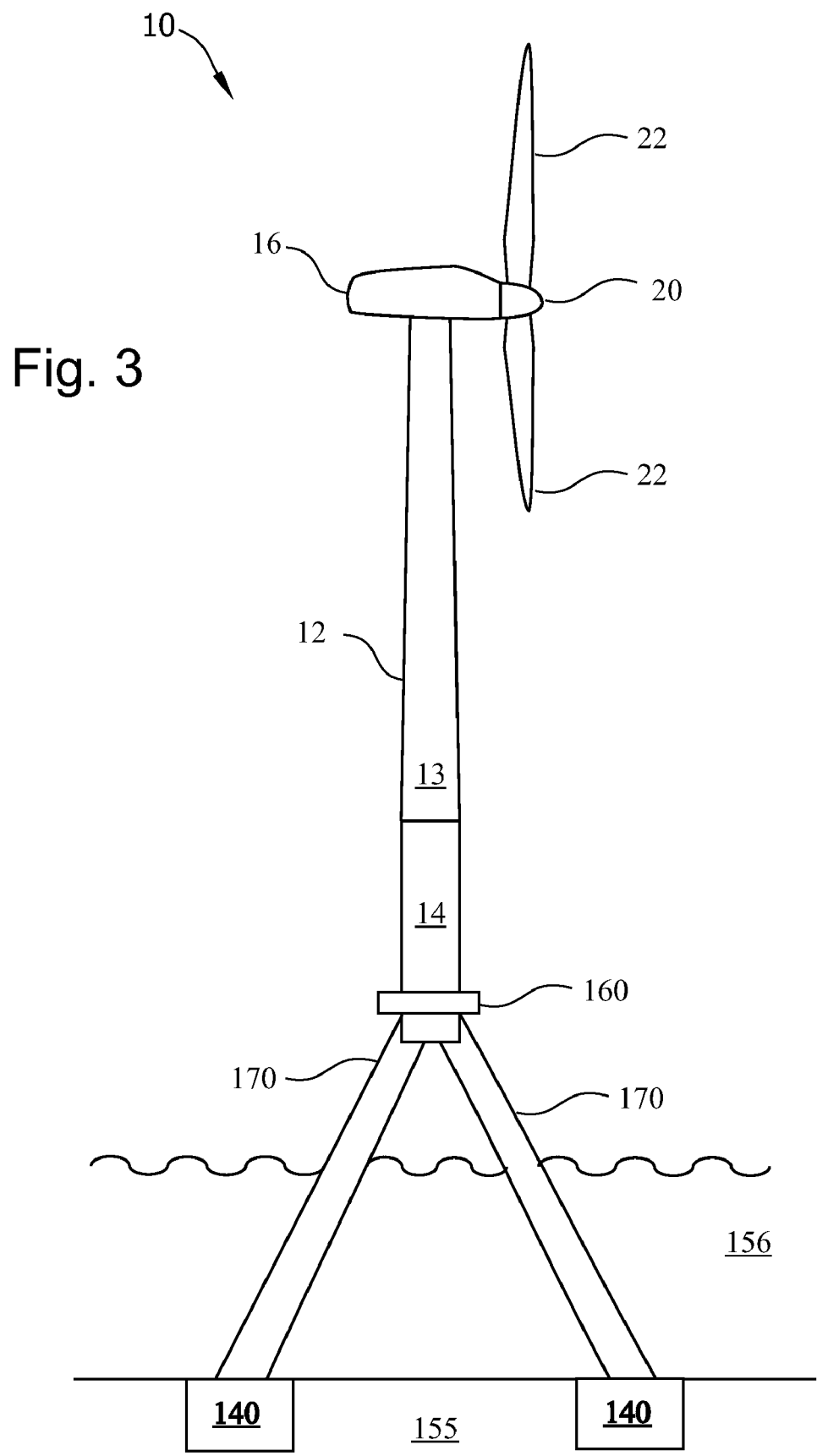

Whereas FIG. 2 shows exemplarily a monopole wind turbine, FIGS. 2 and 3 show a three-pole wind turbine with the connection between tower and sea bed being designed via three poles typically arranged in an equilateral triangle manner. The maximum diameter of a monopole wind turbine is typically in the range of between 4 m and 8 m. The maximum diameter of a multipole wind turbine is typically in the range of between 1 m and 2 m.

According to typical embodiments, the present disclosure relates to monopole wind turbines that typically have one wind turbine tower socket segment and one wind turbine tower plug segment. For instance, the wind turbine tower socket segment may be fixedly connected to the sea bed e.g. by a foundation, and the wind turbine tower plug segment is plugged thereto. According to other embodiments, the wind turbine tower is a three-pole turbine having three wind turbine tower socket segments and three wind turbine tower plug segments described herein.

In many embodiments, as it is also exemplarily shown in FIG. 3, at least one transition segment 170 may be provided that is fixed in the foundation 140. In many embodiments, three transition segments 170 are provided. The connector 160 may be sandwiched between several transition segments on its lower side and the wind turbine main tower on the upper side as shown in FIG. 3. The foundation is typically, and not limited to this embodiment, embedded in the sea bed 155 but may, in other embodiments, not be in direct connection but in a force-fit connection with the sea bed 155.

The at least one transition segment 170 is typically designed so that its/their height in operation of the wind turbine is larger than the water level. Typically, the transition segments 170 are engaged with the foundation 140 onshore so that the foundation is put to the sea ground with the transition segments in one step. It is typical that further elements of the wind turbine are connected to the at least one transition segment at times when the weather condition allows such an installation.

In the embodiment of FIG. 3, the main tower comprises the lower tower segment 14 and the upper tower segment 13. For instance, it is possible that the foundation 140 along with the transition segments 170, the connector 160 and the lower segment 14 are preinstalled. Thereby, the lower tower segment 14 may be a wind turbine tower socket segment as described herein with its basin arranged at its top. Then, in a further step, the wind turbine tower may be mounted to the lower tower segment 14 with the upper tower segment 13 typically being wind turbine tower plug segment as described herein. It shall be noted that the division into the lower tower segment 14 and the upper tower segment 13 is not mandatory but they may be unified in one tower segment only.

Figure 4:
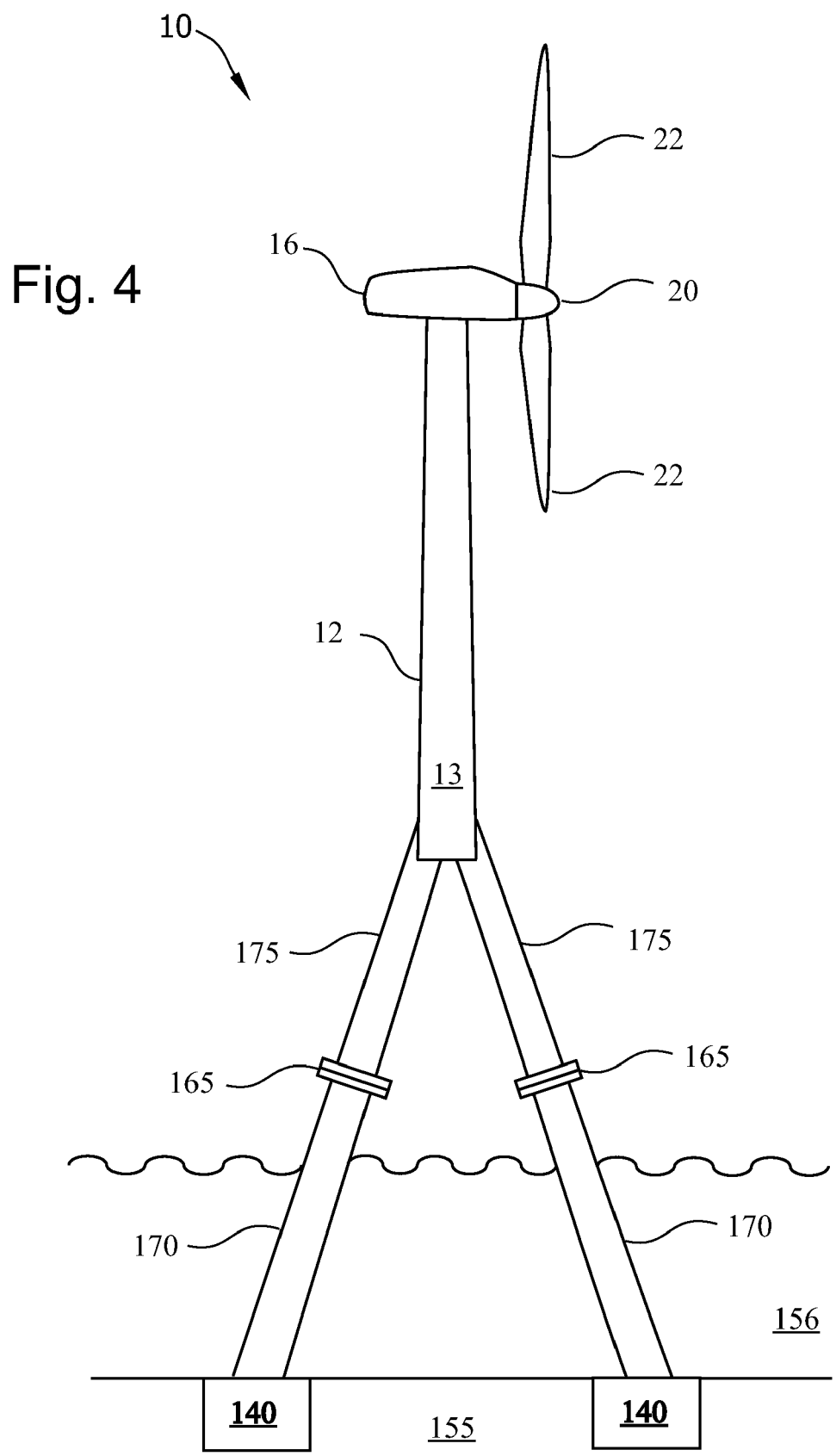

FIG. 4 shows embodiments having three transition segments 170 (in the cross-sectional view only two of them are visible). Further, this embodiment has three connectors 165. Each connector 165 is sandwiched between lower transition segment 170 at its lower side and upper transition segment 175 at its upper side. The upper transition segments 175 run together in the wind turbine tower 12. For instance, the lower transition segments 170 may be the wind turbine socket segments as described herein and the upper transition segments 175 may be the wind turbine plug segments as described herein.

Typically, the shape of the basin and/or the shape of the closed surface of the wind turbine tower plug segment may be tapered. Typically, they are shaped such that air can escape from between the wind turbine tower plug segment and the wind turbine tower socket segment when they are approaching each other. For instance, one or both of them may be cone-shaped with the cone tip typically pointing to the bottom. Typically, the height of the tapered region of the wind turbine tower plug segment and/or the wind turbine tower socket segment in the axial direction of the segments may also be in the range of between 0.5 to 1.0 times the tower diameter. The gap size may be between 0.2 and 2 cm, typically between 0.5 and 1.5 cm.

Figure 5:
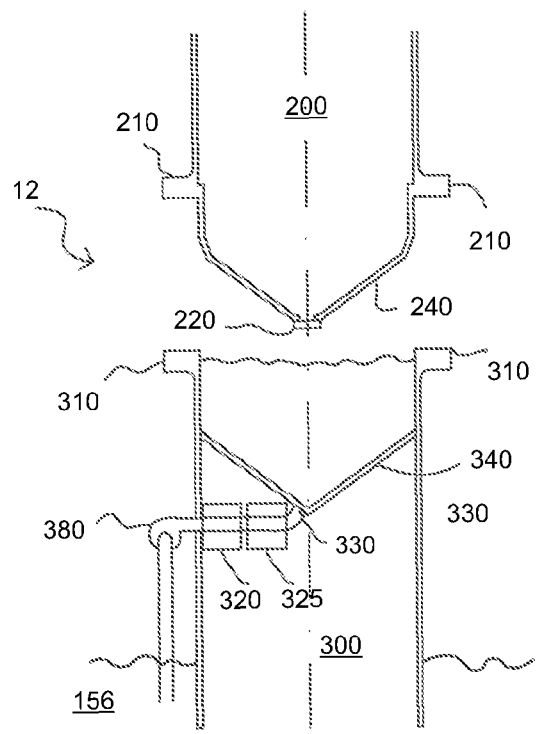
Figure 6:
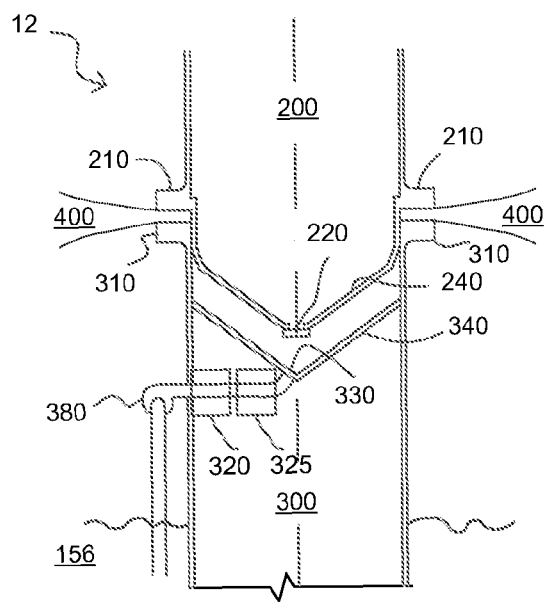
Figure 7:
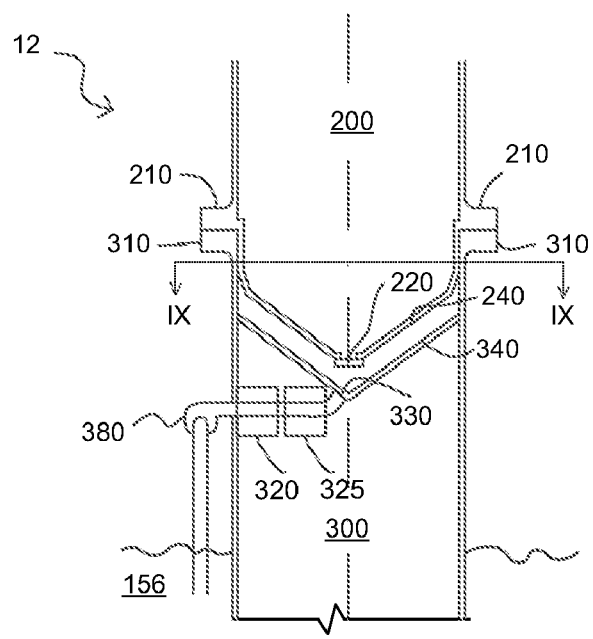

FIGS. 5 to 7 show exemplarily the erection method of the wind turbine according to embodiments. The step of moving the wind turbine tower plug segment into the wind turbine tower socket segment is shown in detail. According to the embodiment shown in these figures, the wind turbine tower socket 300 is located in and in contact with the seawater 156. This is not mandatory according to other embodiments. Further, the wind turbine tower socket segment may be directly mounted to the foundation on its lower end. As exemplarily shown in FIG. 2, the wind turbine tower socket segment may also be fixed to the sea bed 155 by other connection means such as cables or chains.

The wind turbine tower socket segment of FIG. 5 includes a basin 340 that can be filled with water. Hence, the basin's structure is typically water-tight. Further, the wind turbine tower socket segment includes a pipe system 380. The pipe system is typically positioned and designed such that it allows a water flow from the sea 156 into the basin 340. It is possible to have a pump 320 arranged in the wind turbine tower socket segment. In other embodiments, the pump system is provided separately and connected to the socket segment only during erection of the wind turbine.

Further, the basin 340 has typically an opening 330. Typically, the opening 330 is closable e.g. by a valve. In most embodiments, the opening is positioned at the basin's lowest position. For instance, the opening may be opened in order to pump water into the basin 340 via the pipe system 380. A valve system including one or more valves 325 may be provided. Typically, the one or more valves are positioned somewhere within the pipe system. For instance, the valve 325 may be a non-return valve that is adapted for withstanding high pressure, in particular if the basin is filled and the wind turbine tower plug segment is immerged into the basin.

The flanges 310 are positioned on the upper end of the wind turbine tower socket segment and are adapted to be connected to the flanges of the wind turbine tower plug segment 200. As shown in the embodiments of FIGS. 5-7, the flanges extend outwardly.

In FIG. 5, the basin 340 of the wind turbine tower socket segment is filled with water. Typically, and not limited to this embodiment, the water is taken from the sea by means of a pump. In alternative embodiments, the water is provided by a separate tank, e.g. by a tank positioned on the crane vessel or installation boat. This tank may be filled with sea water or fresh water. In other embodiments, more viscous liquids such as oil can be used if feasible and economically as well as ecologically justifiable. Further, it is typically possible to add an anti-corrosion additive to the water pumped into the basin. According to some embodiments, the basin and the pipe system are flushed by an anti-corrosion additive or a solution of an anti-corrosion additive and water after the erection of the wind turbine.

Typically, the pump used for filling the basin is typically capable of filling the basin within 5 minutes, more typically within 1 minute. The pump's power normally allows a flow of at least 1 m$^3$/min, more typically at least 10 m$^3$/min into the basin. Typically, the height to which the pump has to lift the water is between 5 m and 15 m above the sea level. According to embodiments, the pump is adapted for working in zero- or reverse flow direction for certain time periods.

Further in FIG. 5, the wind turbine tower plug segment 200 is shown still dangling in the air. Typically, the wind turbine tower plug segment is attached to a crane that is capable of lowering the wind turbine tower plug segment down into the wind turbine tower socket segment. The crane is positioned on a crane vessel or installation boat.

Due to the motion of the sea, the wind turbine tower plug segment swings somewhat back and forth during the installation of the wind turbine tower. Therefore, erection of the wind turbine is only admissible below certain threshold values of the wave heights. Nonetheless, by providing the buffer system according to the present disclosure, the threshold values are increased as compared to the state of the art.

According to embodiments described herein, tower erection can take place up to wave heights of maximally 3, typically 2 m.

The wind turbine tower plug segment has a closed surface 240. This surface may be provided with an opening 220 that is typically closable. Outwardly extending flanges 210 are positioned on the outer wind turbine tower plug segment's 200 wall.

FIG. 6 shows the same embodiment with the wind turbine tower plug segment 200 being lowered and thereby already immerged into the basin 340 positioned on top of the wind turbine tower socket segment 300. During the lowering of the wind turbine tower plug segment into the water basin 340, the water exerts an upwardly oriented force to the wind turbine tower plug segment. Thereby, the filled water basin acts as a buffer.

The water may stream out of under the wind turbine tower plug segment in the clearance provided between the wind turbine tower plug segment and the wind turbine tower socket segment. In FIGS. 6 and 7, a water stream 400 is shown (see dotted lines) that escapes from the wind turbine tower between the flanges 210 and 310. Designing the size of the clearance and of possibly provided guiders determines the water flow out of the basin at a given lowering speed of the wind turbine plug segment 200.

Additionally or alternatively, the water may be allowed to escape the basin via the pipe system 380. Possibly arranged valves 325 may be controlled for certain periods to allow a flow of water out of the basin. Further, the valves 325 may also allow for controlling the flow amount depending on the lowering speed of the wind turbine tower plug segment 200 and/or the pressure measured within the basin 340.

The embodiment of FIG. 7 shows the wind turbine tower plug segment lowered to its final position, i.e. in direct contact with the wind turbine tower socket segment. Thereby, the wind turbine tower plug segment is secured to the wind turbine tower socket segment by means of the flanges 210 and 310. Typically, one or more technicians from the installation team secure the flanges together by fixation means such as inserting screws, bolts or the like.

Figure 8:
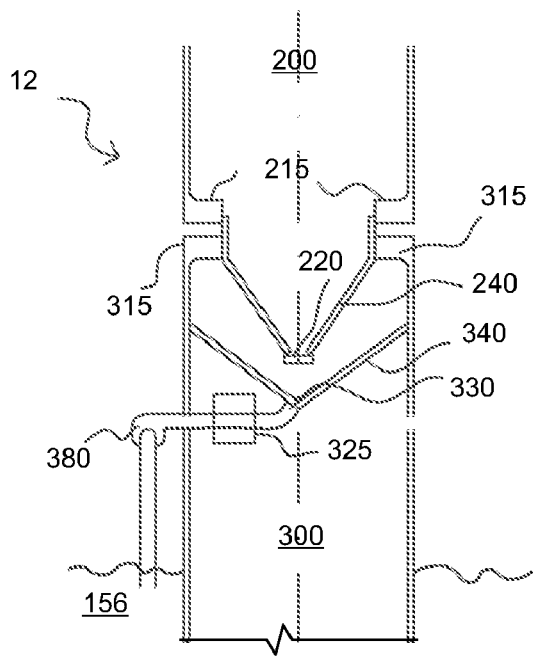

FIG. 8 shows similar embodiments to the embodiments of FIG. 6. The wind turbine tower plug segment is at a position close to its final position. Contrary to the embodiments illustrated in FIG. 6, the flanges 215 and 315 are extending inwardly from the wind turbine tower segments' walls. Further, in the embodiment of FIG. 8 there is no pump shown. Not limited to this embodiment, the pump may be provided separately during erection of the turbine tower.

Typically, the flanges 210 and 310 may also be a double T-flange, allowing fixation means to be positioned both at the inner and at the outer side of the tower.

Figure 9:
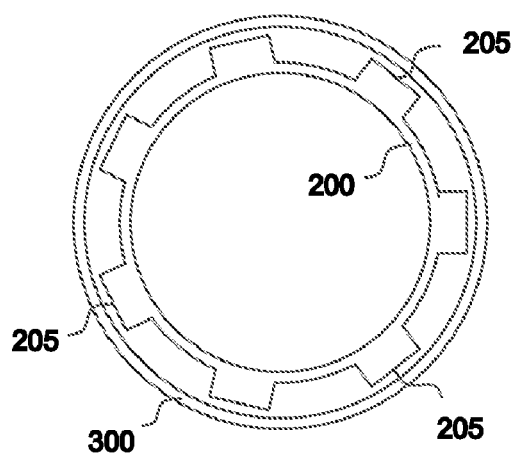

FIG. 9 is a schematic cross-sectional view of the wind turbine tower at the height shown by the dotted line in FIG. 7. According to some embodiments described herein, the wind turbine tower plug segment 200 of embodiments shown in FIGS. 5-8 is provided with guiders 205. The guiders typically extend in the positive radial direction and are normally equidistantly positioned along the circumference of the wind turbine tower plug segment 200. Alternatively or additionally, the guiders 205 could also be positioned on the circumferential inner wall of the wind turbine tower socket segment 300. In the latter case, the guiders typically extend into that region of the basin that is adapted to be filled with water for lowering the wind turbine tower plug segment 200 into it.

The guiders can additionally be provided in order to avoid that the wind turbine tower plug segment is non-concentrically located with respect to the wind turbine tower socket segment during the lowering (which, in many embodiments, would allow the water to escape at lower pressure). The provision of guiders allows a better controllable immersion of the wind turbine tower plug segment. The pressure exerted by the water in the basin can be maximized if the wind turbine tower plug segment is lowered centrally into the basin.

According to embodiments, the shape of the basin 340 and/or the guiders 205 is such that they withstand internal pressure to a higher degree. For instance, the basin may have a cone or sphere like bottom. The guiders' shape may be cone or sphere like (in FIG. 9, for illustrative purposes, their shape is shown rectangular). Typically, the guiders 340 and/or the basin 205 are adapted to withstand a pressure of at least 20 bar, more typically of at least 25 bar. The basin of the wind turbine tower socket segment is typically a water tight reservoir with its walls being adapted for mechanically guiding the wind turbine tower plug segment to the wind turbine tower socket segment.

Normally, the diametrical clearance between the wind turbine tower plug segment and the wind turbine tower socket segment is maximally 3 cm, typically at maximum 1 cm (measured in the radial direction). According to embodiments, the clearance is minimally 0.3 cm, typically at least 0.5 cm. If guiders 205 as described herein are provided, the clearance between the guider surface and the facing tower segment is typically 2 cm at maximum, more typically at maximum 1 cm (measured in the radial direction). Further, the clearance is typically minimally 0.2, more typically at least 0.3 cm. Typically, the surfaces of the wind turbine tower plug segment and/or the wind turbine tower socket segment are machined surfaces providing minimum tolerances.

The following approximate results could be calculated for the maximum lowering speed in dependence on the minimum diametrical clearance (i.e. gap size):

| Gap [mm] | Speed [m/s] |
| --- | --- |
| 5 | 4.95 |
| 4 | 2.53 |
| 3 | 1.07 |
| 2 | 0.32 |
| 1 | 0.04 |

Figure 10:
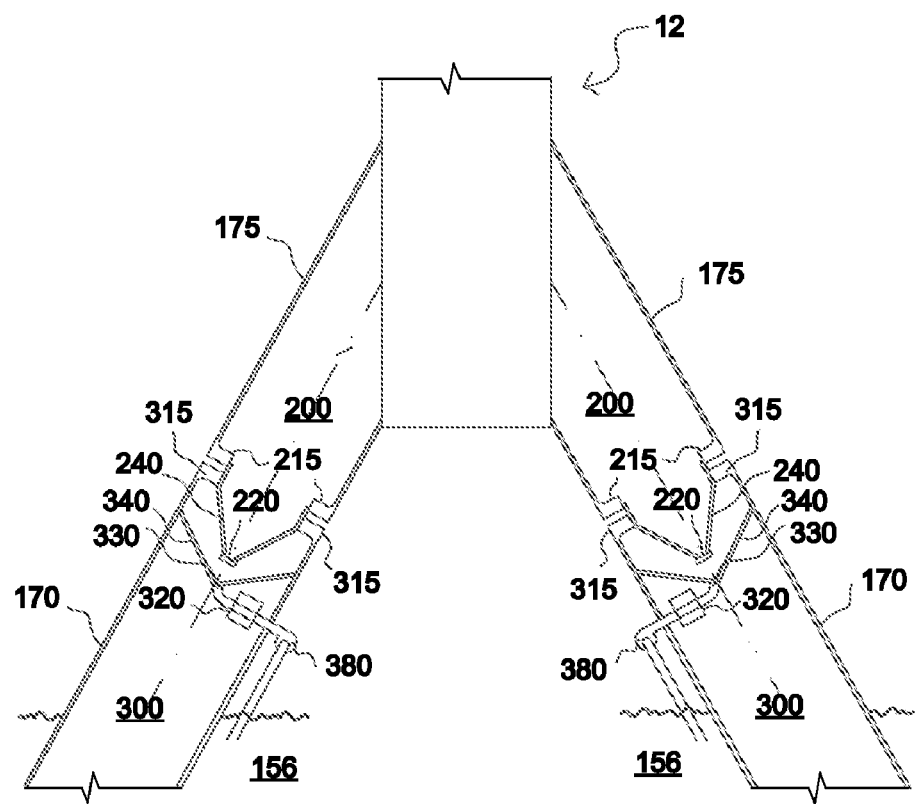

FIG. 10 illustratively shows further embodiments described herein. Whereas the embodiments of FIGS. 5-9 typically correspond to situations where the wind turbine tower plug segment and the wind turbine tower socket segment are parts of the main tower, FIG. 10 illustrates a main tower 12 that is connected to the sea bed 156 via three transition segments 170 and 175 (each two of them are shown in this cross-sectional view). Typically, and not limited to this embodiment, the transition segments can consist of or at least include the wind turbine tower plug segment 200 and the wind turbine tower socket segment 300 according to the present disclosure.

According to further embodiments, the wind turbine tower socket segment is positioned so that the basin is at least partly below sea water level. Typically the basin is immerged in the surrounding water such as the sea water. Typically, the complete wind turbine tower socket segment is positioned in the water below sea level. Such a setup automatically avoids air such as air pockets to be present when the wind turbine tower plug segment is lowered into the basin. Further, a pump system for pumping water into the basin may be omitted according to embodiments.

Figure 11:
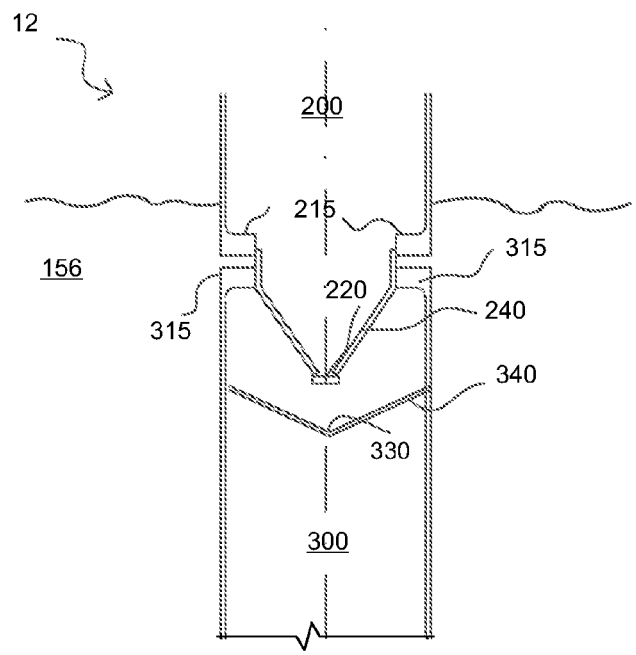
FIG. 11 is a schematic view of a wind turbine tower socket segment and a wind turbine tower plug segment according to embodiments described herein.

FIG. 11 exemplarily illustrates such an embodiment where the complete wind turbine tower socket segment 300 is embedded in the sea water 156. Hence, the basin 340 is automatically filled with water. The wind turbine tower plug segment 200 can be lowered into the basin with the water within the basin serving as damping fluid. The water between the plug and socket segment is pressed out of the basin by the lowering plug segment as described with respect to earlier embodiments. After connecting the wind turbine tower plug and socket segment, it is possible to pump the remaining water out of the basin 340 e.g. by temporarily lowering a hose or the like through the opening 220 into the basin. The position of the wind turbine tower plug segment 200 shown in FIG. 11 is close to its final position.

Figure 12:
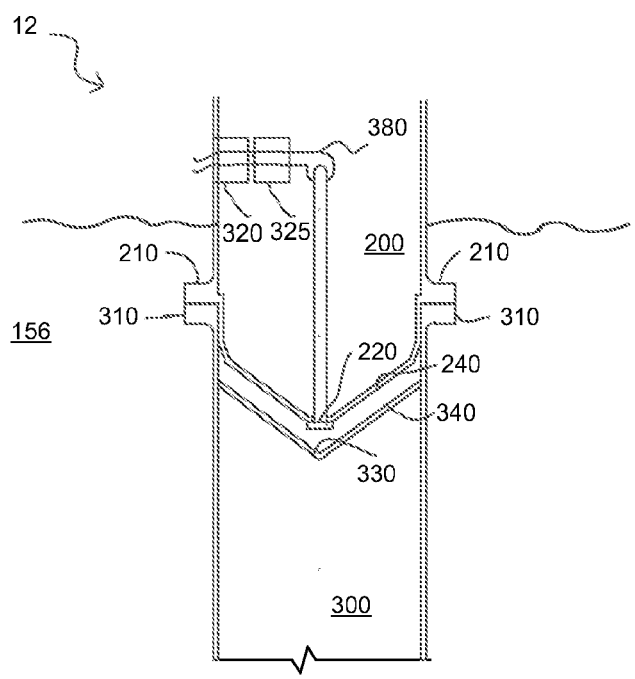
FIG. 12 is a schematic view of a wind turbine tower socket segment and a wind turbine tower plug segment according to embodiments described herein.

FIG. 12 exemplarily illustrates a further embodiment wherein the wind turbine tower socket plug segment is in fixed contact with the wind turbine tower socket segment. Additionally to the elements already shown in FIG. 11, a pipe system 380 is shown along with the optional pump 320 and the valve system 325. One or more these elements can typically be provided to dispose of the water within the basin after the erection of the wind turbine.

Figure 13:
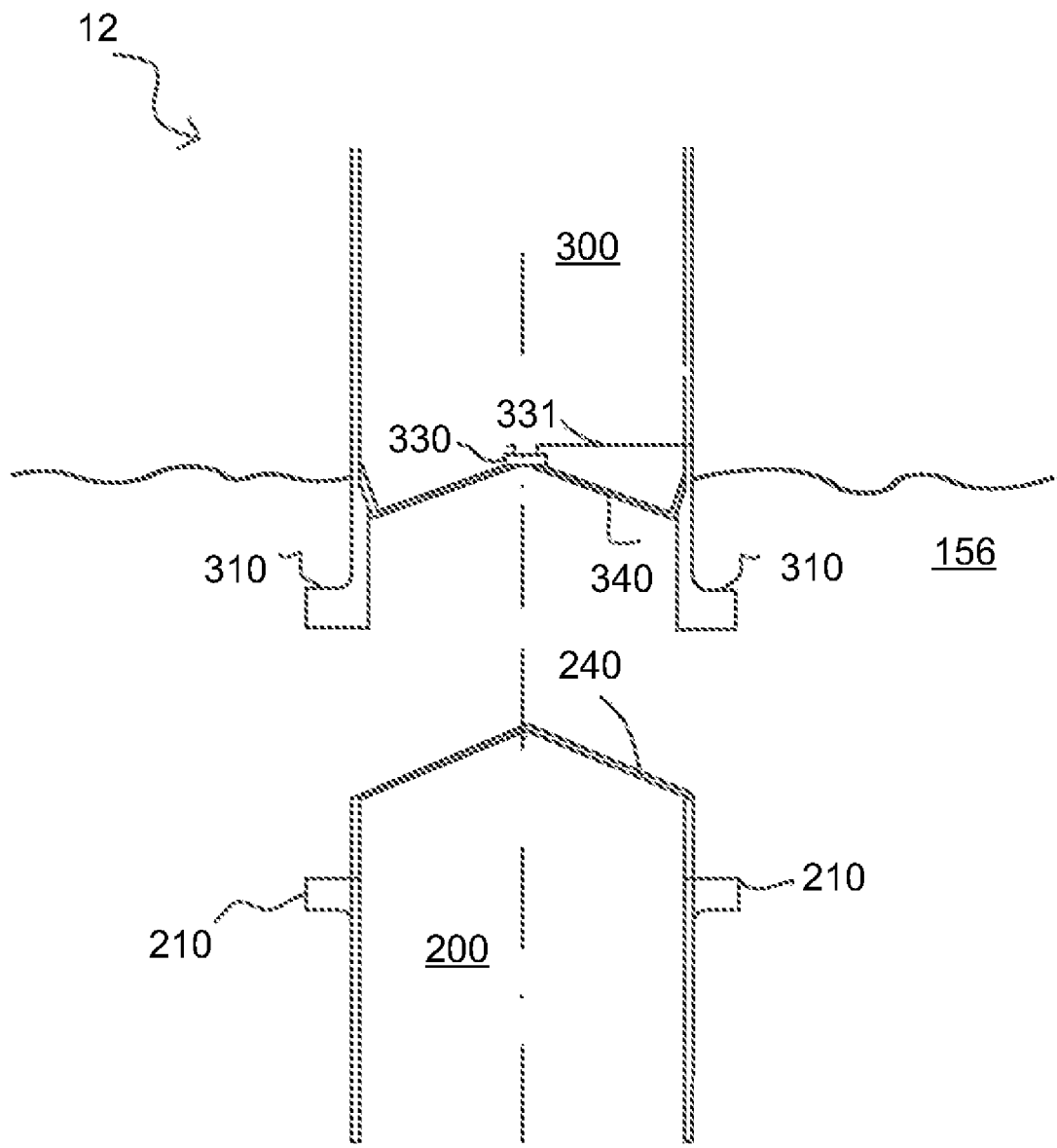
FIG. 13 is a schematic view of a wind turbine tower socket segment and a wind turbine tower plug segment according to embodiments described herein.

FIG. 13 is an illustration of further embodiments described herein wherein the position of the wind turbine tower plug segment and the wind turbine tower socket segment is swapped. So far, the figures illustrated embodiments wherein the lower tower segment is typically the wind turbine tower socket segment 300, and the upper tower segment is typically the wind turbine tower plug segment 200. FIG. 13 illustrates an embodiment wherein the lower tower segment is typically the wind turbine tower plug segment 200, and the upper tower segment is typically the wind turbine tower socket segment 300. Notably, all features explained with respect to the embodiments illustrated in FIGS. 1-12 are also applicable with the embodiment illustrated in FIG. 13.

The wind turbine tower plug segment 200 is typically fixedly mounted to the sea bed via e.g. a foundation (not shown in FIG. 13). The wind turbine tower socket segment 300 having the basin 340 is lowered into the water e.g. by means of a crane. Thereby, the basin 340 is filled with water. It is possible to provide an opening 330 so that the air can escape during lowering the socket segment. If provided, the opening may have an air-releasing device 331 such as used in central heating systems, a valve or a membrane.

The water between wind turbine tower plug segment and wind turbine tower socket segment acts as a damping fluid when the two parts are brought into connection. At the final position, the flanges 210 are fixed to the flanges 310. Every other orientation or shape of the flanges as described herein is possible in the embodiments illustrated in FIG. 13 as well.

This written description uses examples to disclose the invention, including the best mode, and also enables any person skilled in the art to practice the described subject-matter, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for erecting an off-shore wind turbine, comprising:
providing a wind turbine tower socket segment comprising a basin positioned at one end of said segment, the basin comprising a surface of a first shape;
filling said basin with water;
bringing a wind turbine tower plug segment in connection with said wind turbine tower socket segment, said wind turbine tower plug segment comprising a closed surface at its one end, said closed surface having a second shape; and
immerging the closed surface of the wind turbine tower plug segment into the filled basin of the wind turbine tower socket segment, wherein water is pressed out from the basin such that a stream of water flows out of the basin in a controlled manner through at least one of a gap between the first shape and the second shape, and a pipe system.

2. The method of claim 1, wherein said filling comprises pumping water into said basin.

3. The method of claim 1, wherein said filling comprises lowering said wind turbine tower socket segment into water so that said basin is at least partly below a level of the water.

4. A wind turbine tower socket segment for off-shore wind turbines, comprising a basin on one side of said segment, said basin being configured to receive water, and said wind turbine tower socket segment being configured to receive a wind turbine tower plug segment in such a way that when the wind turbine tower plug segment is immerged into the basin filled with water, the water is pressed out from the basin such that a stream of water flows out of the basin in a controlled manner through at least one of a gap between the wind turbine tower socket segment and the wind turbine tower plug segment, and a pipe system.

5. The wind turbine tower socket segment of claim 4, further comprising a valve system for controlling water flow into and out of said basin.

6. The wind turbine tower socket segment of claim 5, wherein said valve system comprises overpressure release valves.

7. The wind turbine tower socket segment of claim 4, further comprising a pump system for pumping water into said basin.

8. The wind turbine tower socket segment of claim 4, further comprising a plurality of guiders positioned on a circumferential inner surface of said wind turbine tower socket segment.

9. The wind turbine tower socket segment of claim 8, wherein the number of guiders is at least four.

10. The wind turbine tower socket segment of claim 8, wherein said guiders are equidistantly positioned along the circumferential inner surface.

11. The wind turbine tower socket segment of claim 4, further comprising an air-releasing device for allowing air to escape from said basin.

12. A wind turbine tower plug segment comprising a closed surface at one end of the wind turbine tower plug segment, and being configured to plug into a wind turbine tower socket segment comprising a basin, such that when the wind turbine tower plug segment is immerged into the basin filled with water, the water is pressed out from the basin such that a stream of water flows out of the basin in a controlled manner through at least one of a gap between the wind turbine tower socket segment and the wind turbine tower plug segment, and a pipe system.

13. The wind turbine tower plug segment of claim 12, further comprising a plurality of guiders positioned on a circumferential outer surface of said wind turbine tower plug segment.

14. The wind turbine tower plug segment of claim 13, wherein the number of guiders is at least four.

15. The wind turbine tower plug segment of claim 13, wherein said guiders are equidistantly positioned along the circumferential outer surface.

16. The wind turbine tower plug segment of claim 12, further comprising a closable opening in the closed surface.

17. The wind turbine tower plug segment of claim 16, wherein said closable opening is configured to allow a person to pass through.

18. A wind turbine comprising:
a wind turbine tower socket segment, said wind turbine tower socket segment comprising a basin on one side of said segment, said basin being configured to receive water; and
a wind turbine tower plug segment comprising a closed surface at one end of said segment;
wherein said wind turbine tower plug segment and said wind turbine tower socket segment are fixed together in such a way that when the wind turbine tower plug segment is immerged into the basin filled with water, the water is pressed out from the basin such that a stream of water flows out of the basin in a controlled manner through at least one of a gap between the wind turbine tower socket segment and the wind turbine tower plug segment, and a pipe system.

* * * * *